June 28, 1932.  F. W. REYNOLDS  1,864,670
ELECTROOPTICAL SYSTEM
Filed Feb. 12, 1929
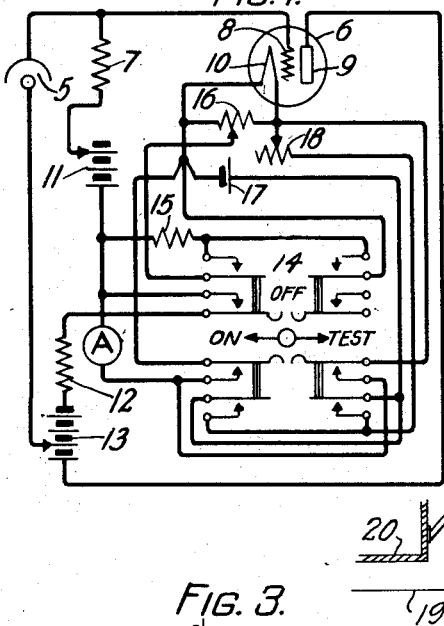
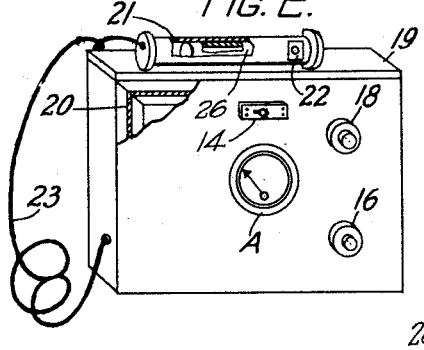
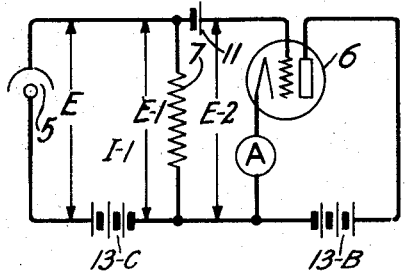
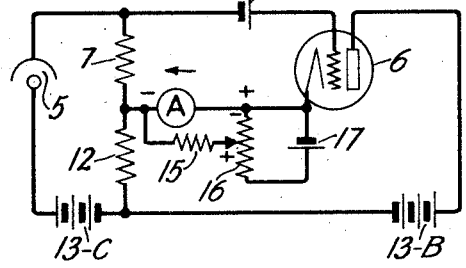
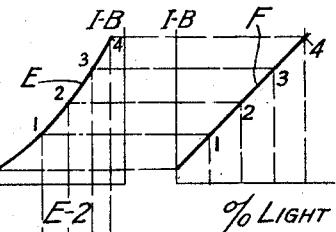
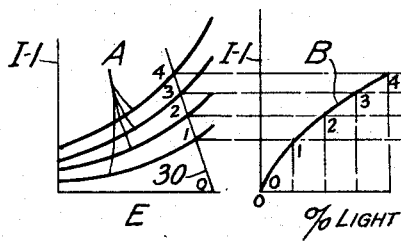
INVENTOR
F. W. REYNOLDS
BY
*[signature]*
ATTORNEY Patented June 28, 1932

1,864,670

UNITED STATES PATENT OFFICE

FREDERICK W. REYNOLDS, OF GRANTWOOD, NEW JERSEY, ASSIGNOR TO AMERICAN TELEPHONE AND TELEGRAPH COMPANY, A CORPORATION OF NEW YORK

ELECTROOPTICAL SYSTEM

Application filed February 12, 1929. Serial No. 339,475.

This invention relates to electro-optical systems and more particularly to means for amplifying photoelectric currents.

An object of the invention is to provide an improved combination of light sensitive cell and amplifier for the conversion of light into electrical currents.

In an arrangement illustrative of the invention, a potassium hydride photoelectric cell is coupled to the input circuit of a vacuum tube amplifier through a coupling resistance, the curvature of the voltage versus current characteristic of the cell being used to compensate for the curvature of the grid voltage versus plate current characteristic of the vacuum tube. In a preferred arrangement, a second resistance common to the cell circuit and the vacuum tube amplifier output circuit produces an opposing voltage on the cell due to current in the output circuit so that the opposing voltage increases with increasing current through the cell.

This invention is particularly adapted for photometric measurements in which portability of the equipment is an advantage. A feature of the invention is the mounting of the apparatus elements, except the photoelectric cell, in a single shielded case, the cell being separately mounted within an easily handled shielded tube and connected to the amplifier by a shielded flexible cord.

The invention is not limited to photometry but can be applied to the electrical transmission of pictures, for example, for the purpose of counterbalancing certain distortions which may be introduced by the photographic processes and the receiving light control device. When used for this purpose it is preferable to obtain the major part of the compensation by means of the resistance common to the cell and the vacuum tube amplifier output circuit and to limit the magnitude of the input resistance to the first vacuum tube to such a value that the time constant of this circuit is not objectionable for the range of picture current frequencies employed. It can be used for numerous other purposes, limited of course, to photoelectric current frequencies with respect to which the time constant of the input circuit of the vacuum tube is not objectionable.

The invention will now be described more in detail having reference to the accompanying drawing.

Figure 1 is a schematic circuit drawing of one embodiment of the invention in the form of a photometer.

Fig. 2 shows an assembly of the arrangement of Fig. 1.

Fig. 2$^a$ is a fragmentary detailed showing of the flexible cord of Fig. 2.

Figs. 3 and 4 are simplified circuit diagrams for use in describing the operation of the invention.

Fig. 5 is a group of explanatory graphs.

Identical elements in the several figures are identified by the same reference characters.

Referring now particularly to Fig. 1, a photoelectric cell 5 is coupled to the input circuit of an electric discharge amplifier 6 by resistance 7. The amplifier 6 comprises a control electrode 8, an anode 9, and a cathode 10. A variable biasing battery 11 is included in the input circuit. The output circuit of the amplifier 6 comprises a resistance 12 and a battery 13. The anode of the photoelectric cell 5 is also connected to battery 13 so that the resistance 12 and a portion of the battery 13 is included in the photoelectric cell circuit. A three position switch 14, in its left-hand position, adapts the circuit for photometric measurements; in its right hand position, provides for testing and adjusting the circuit; and in its intermediate position, deenergizes the system. An ammeter A in conjunction with a resistance 15 and a potentiometer 16 is provided for observation purposes and provides for adjusting the meter to read zero for the dark condition of the cell 5 even though the current in the output circuit of the amplifier 8 is not zero. The cathode or filament 10 is heated by current from battery 17, the amplitude of which is controlled by variable resistance 18.

The equipment of Fig. 1 is preferably assembled as shown in Fig. 2. The amplifier and associated batteries are mounted in a portable cabinet 19 provided with a copper shield 20. The ammeter A, filament control rheostat 18, biasing potentiometer 16 and switch 14 are mounted on the front panel, as shown. The remaining equipment is mounted on an insulating sub-base within the cabinet so that all of the parts are well insulated from the copper shielding. The photoelectric cell is enclosed within a metal container 26 and is mounted in an easily handled holder of fiber tubing 21. A piece of opal glass 22 is mounted over the hole in the tubing opposite the photoelectric cell window so that the light reaching the cell is completely diffused. The electrical connections to the cell are made through two binding posts 27 fastened to one end of the holder 21. A third binding post 28 is connected to the metal container 26 of the photoelectric cell. A length of several feet of shielded double conductor rubber insulated wire 23 is used for connecting the cell to the amplifier. The shielded covering 26′ of this conductor is connected to the third binding post 28 on the cell holder and also to the copper shielding 20 of the cabinet 19.

Fig. 2ᵃ shows a fragment of the shielded conductor 23. This conductor comprises two rubber insulated wires 24 which are covered with insulation and a cotton braid 25 over which is the covering 26′ of braided copper wires.

By means of the equipment just described, linear amplification of photoelectric currents may be effected. An important feature of this arrangement is the utilization of the curvature of the voltage versus current characteristic of the gas filled potassium hydride photoelectric cell to compensate for the curvature of the grid voltage versus plate current characteristic of the thermionic vacuum tube. It has been found possible by this means to secure sufficient amplification with a single vacuum tube to construct a portable photoelectric cell photometer which has substantially a linear light versus current characteristic over a wide operating range of the grid voltage versus plate current characteristic of the vacuum tube.

The underlying principles of the invention will now be described in connection with Figs. 3, 4 and 5.

Fig. 3 is a simplified showing of the circuit of Fig. 1 in which the battery 13 is shown as two separate batteries 13C and 13B. Battery 13C is usually known as the photoelectric cell battery and battery 13B as the plate battery of the amplifier. In this arrangement the resistance 12 has been assumed to have a zero value. The voltage and current values in various portions of this circuit under varying conditions of illumination of the cell 5 are shown in Fig. 5. Each of the graphs A show for the normal operating range the voltage versus current characteristic at constant illumination of a typical gas filled potassium hydride photoelectric cell of the central anode type disclosed in The Bell System Technical Journal for April, 1926, in the article beginning on page 320 by Herbert E. Ives, entitled "The alkali metal photoelectric cell". Curves 1, 2, 3 and 4 are for 25, 50, 75 and 100% illumination. For any given value of voltage shown, the photoelectric current is substantially a linear function of the illumination.

The net voltage E across the photoelectric cell is equal to the voltage of the battery 13C minus the voltage E—1. The voltage E—1 being equal to the product of the photoelectric cell current I—1 times the value of the resistance 7 in ohms; consequently, as the illumination is increased from zero to a maximum value, the input voltage E across the cell is lowered by an amount proportional to the current I—1 times the value of resistance 7. The locus of the points representing the resultant photoelectric current for various values of illumination is given by the solid line 30. The intersection with the abscissa E is the arbitrarily chosen voltage across the cell when dark. The graph B is obtained from the graph A and shows the relationship between the percentage of illumination and the photoelectric cell current I—1.

The voltage drop E—1 corresponding to these various values of photoelectric cell current I—1 is shown by the graph D. The graph C shows the corresponding voltage difference E—2 between the grid and filament of the amplifier 6. The graph E is the grid voltage versus plate current characteristic of the vacuum tube 6. Graph F is derived from graph E, by noting that for each percentage of illumination of the cell there is a corresponding value of current in the output circuit of the amplifier 6. For five intensities of illumination, the corresponding points on the various graphs are shown by the numerals zero to four inclusive.

It is to be noted that the graph B is convex and so compensates for the concavity of the graph E to produce a linear relationship as shown by graph F.

In order to provide a greater degree of control for the curvatures of the graphs B and E, the resistance 12 is provided as shown in Fig. 4. This resistance 12 is common to the plate circuit of the amplifier 6 and to the circuit of the photoelectric cell 5 and serves two functions. It tends to straighten out the characteristic E of the vacuum tube 6 and at the same time produces an additional voltage component in opposition to the photoelectric cell battery 13C to cause a greater curvature of the characteristic B. By varying the voltage of the grid battery 11, the used range of the characteristic E may be varied as the circumstances require.

It may happen that for the dark condition of the cell there is a certain amount of plate current flowing for the condition producing linear amplification. In order that the ammeter A may read zero for the dark condition and its readings vary in proportion to the increase in percentage of illumination, a potentiometer 16 and resistance 15, as shown in Figs. 1 and 4, are provided. By this arrangement the normal voltage drop across the ammeter A due to plate current in the vacuum tube 6 may be neutralized by the voltage drop across a portion of the potentiometer 16 due to current flowing therethrough from the battery 17.

Suitable values for one example of practice will now be given. The photoelectric cell 5 is a potassium hydride cell of the type hereinbefore described. The amplifier 6 is a 239—A Western Electric vacuum tube; the resistance 7 is 20 megohms; the resistance 12 is 10,000 ohms; the potentiometer 16 is 10,000 ohms; the resistance 15 is 2,000 ohms; the rheostat 18 has a maximum value of 4 ohms; the battery 13 is 90 volts; while the battery 11 is 15 volts; the ammeter A is a Weston model No. 301, 1 milliammeter; and the battery 17 is a 1.5 volt dry cell.

The amplifier according to this invention may comprise a tandem amplifier comprising a plurality of stages, providing only that an odd number of stages be employed. It is to be understood that a single stage amplifier has an odd number of stages.

Various embodiments of the invention may be made coming within the purview of this invention, the scope of which is defined in the appended claims.

What is claimed is:

1. An electro-optical system comprising a photoelectric cell, a vacuum tube amplifier, the input voltage versus output current characteristic of which comprises a concave portion, a source of current for said cell, means to impress a voltage on the input circuit of said amplifier in accordance with the current flowing through said cell, the working range of the graph of illumination versus cell current being convex and means to produce a correspondence of operation over the concave portion of the amplifier characteristic and the convex working range of the cell characteristic.

2. In an electro-optical system, a photoelectric cell, a source of current and a resistance in series with said cell, a vacuum tube amplifier having an odd number of stages, an input and an output circuit for said amplifier, means to include a portion of said resistance in the input circuit, and means to include a portion of such magnitude in the output circuit that the voltage impressed on the cell is materially modified by reason of the current in said output circuit.

3. In an electro-optical system, a photoelectric cell, a source of current and a resistance in series with said cell, a vacuum tube amplifier having an odd number of stages, each stage comprising a control electrode, an anode, and a cathode, means to connect the control electrode of the input stage to a point in said resistance, means to connect the anode of the output stage to another point, and means to connect the cathode to a point intermediate said other two points to cause the voltage which is impressed on said cell, to be materially modified by reason of the current in the anode circuit of said output stage.

4. The method of amplifying the electrical response of a photoelectric cell to variations in light intensity impressed thereon, said cell having a curved voltage versus current characteristic, which method comprises producing a responsive current variation in a circuit associated with the cell, amplifying said current variations, and causing said amplified current variations to alter the net voltage applied across the cell terminals in such a manner as to materially alter the shape of the effective light input versus current response characteristic of the cell and associated amplifier.

In testimony whereof, I have signed my name to this specification this 8th day of February, 1929.

FREDERICK W. REYNOLDS.